United States Patent
Vaughan et al.

(10) Patent No.: US 8,352,865 B2
(45) Date of Patent: Jan. 8, 2013

(54) ACTION REPRESENTATION DURING SLIDE GENERATION

(75) Inventors: Paul Bradford Vaughan, Pittsburgh, PA (US); James Eric Tilton, Austin, TX (US); Christopher Morgan Connors, San Jose, CA (US); Ralph Lynn Melton, Pittsburgh, PA (US); Jay Christopher Capela, Santa Cruz, CA (US); Ted Stephen Boda, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 761 days.

(21) Appl. No.: 12/345,513

(22) Filed: Dec. 29, 2008

(65) Prior Publication Data

US 2009/0119597 A1 May 7, 2009

Related U.S. Application Data

(63) Continuation-in-part of application No. 11/834,614, filed on Aug. 6, 2007, now abandoned.

(51) Int. Cl.
*G06F 3/00* (2006.01)
(52) U.S. Cl. ..................................... 715/732
(58) Field of Classification Search .............. 715/731, 715/732, 768
See application file for complete search history.

(56) References Cited

U.S. PATENT DOCUMENTS

| | | | |
|---|---|---|---|
| 6,396,500 B1 * | 5/2002 | Qureshi et al. | 345/473 |
| 6,717,591 B1 * | 4/2004 | Fiveash et al. | 715/732 |
| 7,102,643 B2 * | 9/2006 | Moore et al. | 345/473 |
| 7,156,212 B1 * | 1/2007 | Ciotti et al. | 188/72.4 |
| 2005/0041872 A1 | 2/2005 | Yim et al. | |
| 2005/0060759 A1 * | 3/2005 | Rowe et al. | 725/143 |
| 2007/0101251 A1 * | 5/2007 | Lee et al. | 715/501.1 |

FOREIGN PATENT DOCUMENTS

EP 1508875 2/2005

OTHER PUBLICATIONS

Anonymous; "Animations and Transitions", Versions 97/200, pp. 1-6; May 31, 2004 http://niobrara.unl.edu/users/lana/extension/ppt/lesson9/lesson9.HTML.
May, Andrew; "Creating Animation Sequences in PowerPoint 2003 (Part 1)", p. 1 chapter "introduction", p. 2, chapter "How Animation Sequences are Structured", p. 3, figure 1 and explanation below, p. 5, first paragraph; Jun. 30, 2004 http://msdn.microsoft.com/en-us/library/aa168134(office.11).aspx.
Fernicola, Pablo; "WPF-Pick Your API Abstraction", Mar. 21, 2006 http://www.fernicola.org/loquitor/index.php?/archives/17-WPF-Pick-Your-API-Abstraction.html.
Anonymous; "Smoother Animation with Hardware Acceleration", The PowerPoint Blog, Nov. 25, 2006; on-line http://pptblog.tlccreative.com/index.php/all/2006/11/25/smoother_animation_with_hardware_acceler.

(Continued)

*Primary Examiner* — Thanh Vu
(74) *Attorney, Agent, or Firm* — Fletcher Yoder PC

(57) ABSTRACT

Techniques for displaying object animations on a slide are disclosed. In accordance with these techniques, objects on a slide may be assigned actions when generating or editing the slide. The effects of the actions on the slide are depicted using one or more respective representations which represent the slide as it will appear after implementation of one or more corresponding actions.

20 Claims, 11 Drawing Sheets

OTHER PUBLICATIONS

Negrino, Tom; "Take advantage of the new animation tricks in Keynote '08", Feb. 6, 2008, pp. 1-5 http://www.macdeveloperjournal.com/article/131976/2008/02/www.idgconnect.com.

U.S. Appl. No. 11/834,614, filed Aug. 6, 2007, Applicatant Eric Tilton; Entitled: Action Builds and Smart Builds for Use in a Presentation Application.

NVIDIA, "What is a GPUT?" 2004, http://www.nvidia.co.uk/content/nsist_on_nvidiadotcom_uk/whatisagpu.html.

Faithe Wempen, "PowerPoint 2007 Bible," Feb. 2007, John Wiley & Sons.

U.S. Appl. No. 12/694,228, filed Jan. 26, 2010, Ted Stephen Boda.

* cited by examiner

ACTION REPRESENTATION DURING SLIDE GENERATION

CROSS-REFERENCE TO RELATED APPLICATIONS

This application is a continuation-in part of U.S. patent application Ser. No. 11/834,614, entitled "Action Builds and Smart Builds for use in a Presentation Application", filed Aug. 6, 2007, which is herein incorporated by reference in its entirety for all purposes.

BACKGROUND

1. Technical Field

The present invention relates generally to generating slides for a presentation.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

One use which has been found for computers has been to facilitate the communication of information to an audience. For example, it is not uncommon for various types of public speaking, (such as lectures, seminars, classroom discussions, keynote addresses, and so forth), to be accompanied by computer generated presentations that emphasize or illustrate points being made by the speaker. For example, such presentations may include music, sound effects, images, videos, text passages, numeric examples or spreadsheets, or audiovisual content that emphasizes points being made by the speaker.

Typically, these presentations are composed of "slides" that are sequentially presented in a specified order. These slides may include a variety of graphical objects, such as pictures, clipart, shapes, text, images, and so forth. The graphical objects on a slide may be moved on the slide or subjected to various visual effects when the slide is presented. However, design of such graphically complex slides may be difficult, particularly where multiple graphical objects are provided on the slide and/or where complex or combined motion or other effects are implemented.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for generating slides on which graphical objects are moved or undergo other actions, i.e., effects, on a slide. For example, an action or sequence of actions may be specified to be performed on one or more objects on a slide. In one embodiment, the assignment of such actions to objects on the slide may be performed on a screen that depicts representations of the objects as they will appear after each action is performed. The different actions may then be reviewed and/or modified at this screen. That is, an object undergoing a movement action will be depicted at locations prior to and after the move. Likewise, an object being rotated will be depicted both prior to and after rotation, and so forth. Further, for more complex action sequences, each of the actions may be simultaneously displayed for review and/or modification.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to providing a visual representation of an object as it would appear after an action is implemented. In certain embodiments, the representation might be manipulated to configure the manner in which the action is to be performed, such as by moving the representation to a different destination location or rotating the representation to configure the degree of rotation applied to the object. With this in mind, an example of a suitable device for use in accordance with the present disclosure is as follows.

Figure 1:
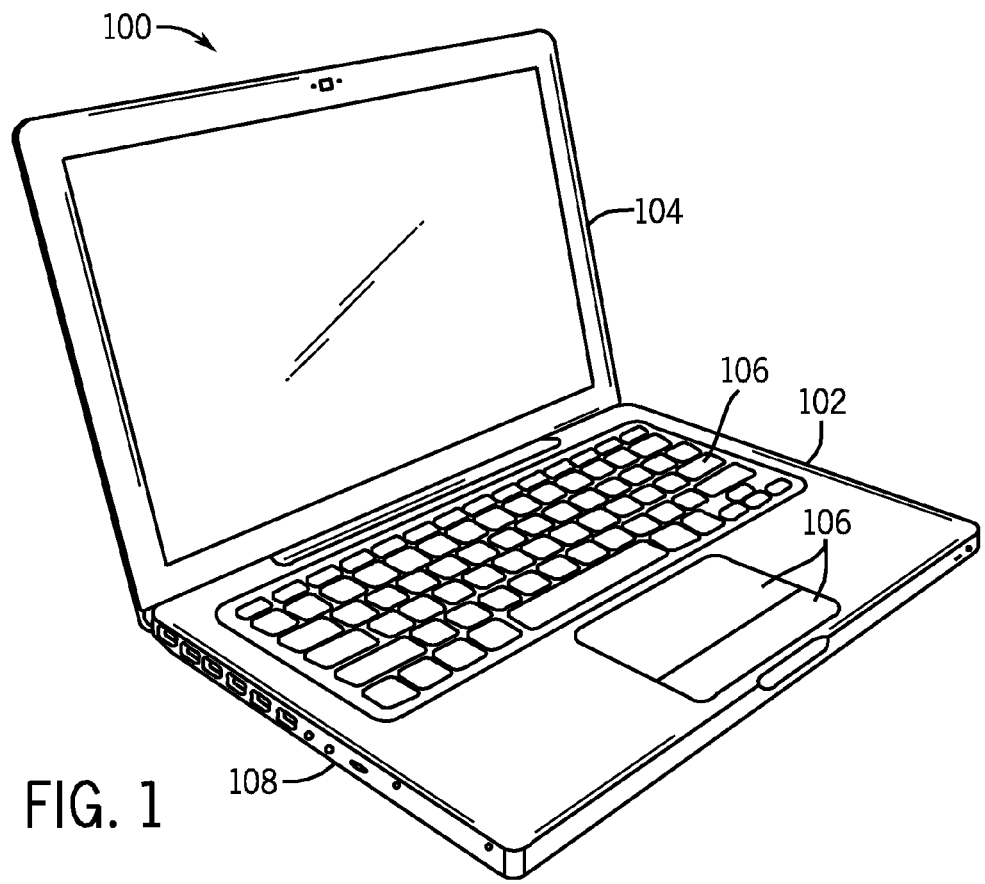
FIG. 1 is a perspective view illustrating an electronic device in accordance with one embodiment of the present invention.

An exemplary electronic device 100 is illustrated in FIG. 1 in accordance with one embodiment of the present invention. In some embodiments, including the presently illustrated embodiment, the device 100 may be processor-based system, such as a laptop or desktop computer, suitable for preparing and/or displaying presentations, such as using the Keynote® software package available from Apple Inc. as part of the iWork® productivity package. Other processor-based systems suitable for preparing and/or displaying presentations may include servers, thin-client workstations, portable or handheld devices capable of running presentation software, or the like. By way of example, the electronic device 100 may be a model of a MacBook®, MacBook® Pro, MacBook Air®, iMac®, Mac® mini, or Mac Pro® available from Apple Inc.

In the presently illustrated embodiment, the exemplary electronic device 100 includes an enclosure or housing 102, a display 104, input structures 106, and input/output connectors 108. The enclosure 102 may be formed from plastic, metal, composite materials, or other suitable materials, or any combination thereof. The enclosure 102 may protect the interior components of the electronic device 100 from physical damage, and may also shield the interior components from electromagnetic interference.

Figure 2:
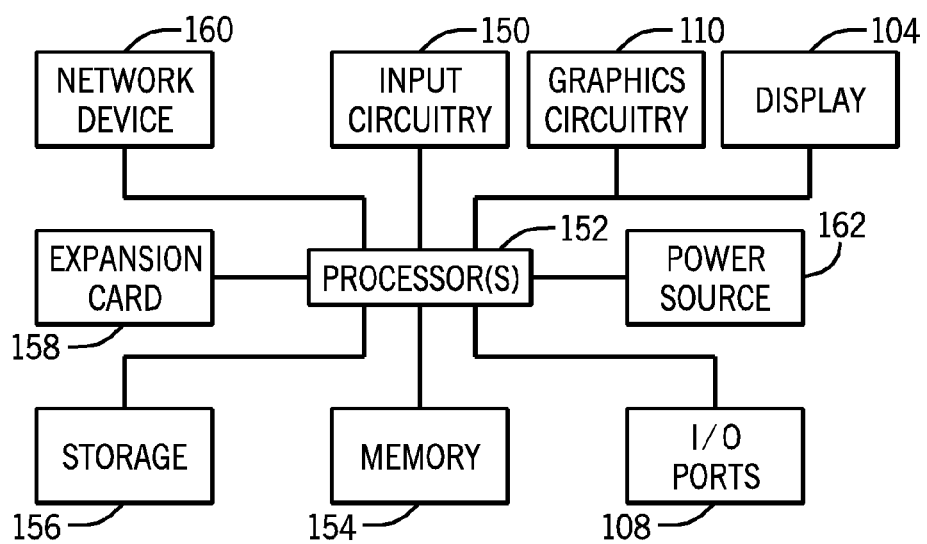
FIG. 2 is a simplified block diagram illustrating components of an electronic device in accordance with one embodiment of the present invention.

The display 104 may be a liquid crystal display (LCD), cathode ray tube (CRT) or other suitable display type. For example, in one embodiment, a suitable LCD display may be based on light emitting diodes (LED) or organic light emitting diodes (OLED). In certain implementations, the display 104 may be controlled by graphics circuitry 110 (FIG. 2). Graphics circuitry 110 may include a graphics processing unit (GPU) and associated memory and buffers, such as may be present on a dedicated graphics card suitable for rendering two- and three-dimensional graphics operations.

In one embodiment, one or more of the input structures 106 are configured to control the device 100 or applications running on the device 100. Embodiments of the electronic device 100 may include any number of input structures 106, including buttons, switches, a mouse, a control or touch pad, a keyboard, a keypad, a touchscreen, or any other suitable input structures. The input structures 106 may operate to control functions of the electronic device 100 or applications running on the device 100 and/or any interfaces or devices connected to or used by the electronic device 100. For example, the input structures 106 may allow a user to navigate a displayed user interface or application interface.

The exemplary device 100 may also include various input and output ports 108 to allow connection of additional devices. For example, the device 100 may include any number of input and/or output ports 108, such as headphone and headset jacks, video ports, universal serial bus (USB) ports, IEEE-1394 ports, Ethernet and modem ports, and AC and/or DC power connectors. Further, the electronic device 100 may use the input and output ports 108 to connect to and send or receive data with any other device, such as a modem, external display, projector, networked computers, printers, or the like. For example, in one embodiment, the electronic device 100 may connect to a scanner, digital camera or other device capable of generating digital images (such as an iPhone® or other camera-equipped cellular telephone) via a USB connection to send and receive data files, such as image files.

The electronic device 100 includes various internal components which contribute to the function of the device 100. FIG. 2 is a block diagram illustrating the components that may be present in the electronic device 100 and which may allow the device 100 to function in accordance with the techniques discussed herein. Those of ordinary skill in the art will appreciate that the various functional blocks shown in FIG. 2 may comprise hardware elements (including circuitry), software elements (including computer code stored on a machine-readable medium) or a combination of both hardware and software elements. It should further be noted that FIG. 2 is merely one example of a particular implementation and is merely intended to illustrate the types of components that may be present in a device 100 that allow the device 100 to function in accordance with the present techniques.

In the presently illustrated embodiment, the components may include the display 104, the I/O ports 108, and the graphics circuitry 110 discussed above. In addition, as discussed in greater detail below, the components may include input circuitry 150, one or more processors 152, a memory device 154, a non-volatile storage 156, expansion card(s) 158, a networking device 160, and a power source 162.

The input circuitry 150 may include circuitry and/or electrical pathways by which user interactions with one or more input structures 106 are conveyed to the processor(s) 152. For example, user interaction with the input structures 106, such as to interact with a user or application interface displayed on the display 104, may generate electrical signals indicative of the user input. These input signals may be routed via the input circuitry 150, such as an input hub or bus, to the processor(s) 152 for further processing.

The processor(s) 152 may provide the processing capability to execute the operating system, programs, user and application interfaces, and any other functions of the electronic device 100. The processor(s) 152 may include one or more microprocessors, such as one or more "general-purpose" microprocessors, one or more special-purpose microprocessors and/or ASICS, a microcontroller, or some combination thereof. For example, the processor 152 may include one or more instruction processors, as well as graphics processors, audio processors, video processors, and/or related chip sets.

As noted above, the components may also include a computer-readable media in the form of a memory 154. The memory 154 may include a volatile memory, such as random access memory (RAM), and/or a non-volatile memory, such as read-only memory (ROM). The memory 154 may store a variety of information and may be used for various purposes. For example, the memory 154 may store firmware for the electronic device 100 (such as a basic input/output instruction or operating system instructions), other programs that enable various functions of the electronic device 100, user interface functions, processor functions, and may be used for buffering or caching during operation of the electronic device 100.

The components may further include other computer-readable media, such as a non-volatile storage 156. The non-volatile storage 156 may include flash memory, a hard drive, or any other suitable optical, magnetic, or solid-state storage medium, or a combination thereof. The non-volatile storage 156 may be used to physically encode and store data files such as media content (e.g., music, image, video, and/or presentation files), software (e.g., a presentation application for implementing the presently disclosed techniques on electronic device 100), wireless connection information (e.g., information that may enable the electronic device 100 to establish a wireless connection, such as a telephone or wireless network connection), and any other suitable data. In some embodiments, non-volatile storage 156 may store programs or applications executable on the processor 152, maintain files formatted to be read and edited by one or more of the applications, and store any additional files that may aid the operation of one or more applications (e.g., files with metadata). It will be understood that data may be stored interchangeably in memory 154 and storage device 156, based on the operation of the electronic device 110.

The embodiment illustrated in FIG. 2 may also include one or more card slots. The card slots may be configured to receive an expansion card 158 that may be used to add functionality to the electronic device 100, such as additional memory, I/O functionality, or networking capability. Such an expansion card 158 may connect to the device through any type of suitable connector, and may be accessed internally or external to the enclosure 102. For example, in one embodiment, the expansion card 158 may be flash memory card, such as a SecureDigital (SD) card, mini- or microSD, CompactFlash card, Multimedia card (MMC), or the like.

The components depicted in FIG. 2 also include a network device 160, such as a network controller or a network interface card (NIC). In one embodiment, the network device 160 may be a wireless NIC providing wireless connectivity over any 802.11 standard or any other suitable wireless networking standard. The network device 160 may allow the electronic device 100 to communicate over a network, such as a Local Area Network (LAN), Wide Area Network (WAN), or the Internet. Further, the electronic device 100 may connect to and send or receive data with any device on the network, such as portable electronic devices, personal computers, printers, and so forth. Alternatively, in some embodiments, the electronic device 100 may not include a network device 160. In such an embodiment, a NIC may be added into card slot 158 to provide similar networking capability as described above.

Further, the components may also include a power source 162. In one embodiment, the power source 162 may be one or more batteries, such as a lithium-ion polymer battery. The battery may be user-removable or may be secured within the housing 102, and may be rechargeable. Additionally, the power source 162 may include AC power, such as provided by an electrical outlet, and the electronic device 100 may be connected to the power source 162 via a power adapter. This power adapter may also be used to recharge one or more batteries if present.

Figure 3:
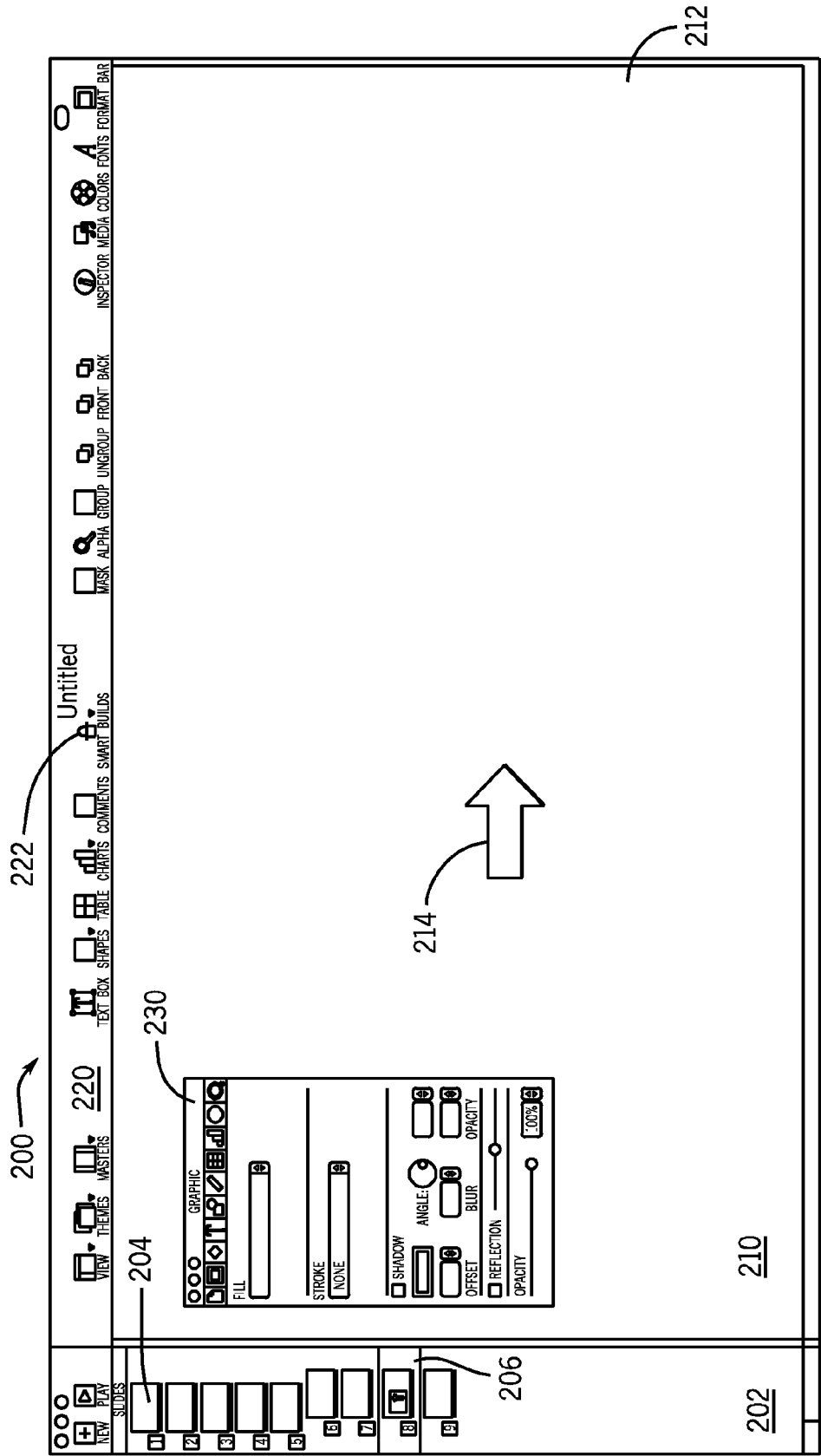
FIG. 3 depicts a screen of a presentation application used for generating slides in accordance with one embodiment of the present invention.

With the foregoing discussion in mind, various techniques and algorithms for implementing aspects of the present disclosure on such electronic devices 100 and accompanying hardware and memory devices are discussed below. Turning to FIG. 3, an illustrative screen 200 of a presentation application (such as Keynote® available from Apple Inc.) is depicted in accordance with one embodiment of the invention. The application may be stored as one or more executable routines in memory 154 and/or storage 156 (FIG. 2) and, when executed, may display on screen 200.

The presentation application may provide multiple modes of operation, such as an edit mode and a presentation mode. When in the edit mode, the presentation application may provide a convenient and user-friendly interface for a user to add, edit, remove, or otherwise modify the slides of a slide show. For example, when in the edit mode, the user may add or remove text, numeric, graphic, or video objects on the slide and/or may assign actions and/or effects to one or more of the objects provided on a slide. When in the presentation mode, the user may display a created slide or a sequence of slides in a format suitable for audience viewing. In some embodiments, the presentation application may provide a full-screen presentation of the slides in the presentation mode, including any animations, transitions, or other properties defined for each object within the slides.

As used herein, the term "object" refers to any individually editable component on a slide of a presentation. That is, something that can be added to a slide and/or be altered or edited on the slide, such as to change its location, size, orientation, appearance or to change its content, may be described as an object. For example, a graphic, such as an image, photo, line drawing, clip-art, chart, table, which may be provided on a slide may constitute an object. In addition, a character or string of characters may constitute an object. Likewise, an embedded video clip may also constitute an object that is a component of a slide.

Turning to the figures, the screen 200 of FIG. 3 represents a screen that may be displayed when a presentation application is in an edit mode, such as for slide creation or modification. In the depicted example, the screen 200 includes three panes: a slide organizer 202, a slide canvas 210, and a toolbar 220 for creating and editing various aspects of a slide of a presentation. By using these panes, a user may select a slide of a presentation, add and/or edit the contents of a slide, and animate or add effects related to the contents of a slide. It should be understood that the size of each pane in display screen 200 is merely illustrative, and that the relative size of each pane may be adjusted by a user.

The slide organizer 202 may display a representation 204 of each slide of a presentation that is being generated or edited. The slide representations 204 may take on a variety of forms, such as an outline of the text in the slide or a thumbnail image of the slide. Slide organizer 202 may allow the user to organize the slides prepared using the application. For example, the user may determine or manipulate the order in which the slides are presented by dragging a slide representation 204 from one relative position to another. As illustrated in FIG. 3, the slides representations 204 in slide organizer 202 may be indented or otherwise visually set apart for further organizational clarity.

In certain implementations, selection of a slide representation 204 in the slide organizer 202 results in the presentation application displaying the corresponding slide information on the slide canvas 210. For example, for a selected slide representation (identified by highlight region 206) the corresponding slide may be displayed as slide 212 on the slide canvas 210. The displayed slide 212 may include one or more suitable objects 214 such as, for example, text, images, graphics, video, or any other suitable object. In some embodiments, a user may add or edit features or properties of a slide 214 when displayed on the slide canvas 210. For example, a user may edit settings or properties associated with slide 212 (e.g., the slide background or template) on the canvas 210 or may edit the location, orientation, size, properties, and/or animation of objects (e.g., object 214) in the selected slide. The user may select a different slide 212 to be displayed for editing on slide canvas 210 by selecting a different slide representation 204 from the slide organizer 202, such as by using input structures 106 (FIG. 1).

In the depicted implementation a user may customize objects 214 associated with slide 212 or the properties of slide 212 using various tools provided by the presentation application in association with the canvas 210. For example, a toolbar 220 may include several selectable icons 222 for activating respective tools and/or functions that may be used in creating or editing the slide 212. For example, the toolbar 220 may include an icon that, when selected, activates a build tool that allows one or more objects (e.g., images, tables, videos, etc.) to be selected and/or grouped. Animations (motion, rotation, changes in size, shading, color, opacity, and so forth) may be generated for such selected objects or groups of objects. These animations may be rendered using hardware acceleration and/or other capabilities of the graphics circuitry 110 (FIG. 2). In some embodiments, the animations may be rendered in real-time (e.g., using dedicated graphics circuitry, such as a GPU on a video card) when slides containing the animations are displayed or presented as part of a presentation.

In some embodiments, screen 200 may allow an options window 230 to be opened or displayed. The presentation application may display the options window 230 automatically (e.g., based on the presentation application context) or in response to a user instruction (e.g., in response to a user instruction to display options related to one or more selected objects). Such an options window 230 may be moved, resized, and/or minimized/maximized independently of panes 202, 210, and 220, for example as an overlay over any of the panes. Options window 230 may provide one or more user input mechanisms of any suitable type, such as drop down menus, radio buttons, sliders, and so forth. The options available from options window 230 may vary based on a tool selected in toolbar 220 or by a type of object(s) 214 selected on the slide 212. For example, the options window 230 may provide different respective options if a table, video, graphic, or text is selected on the slide 212 or if no object 214 is selected. It will be understood that although only one options window 230 is shown in FIG. 3, screen 200 may include any suitable number of option windows 230.

In some embodiments, a user may animate, transform, or otherwise apply an effect to one or more objects 214 in a slide 212 of a presentation, such as to generate a new slide or a build, e.g., an animation step, within an existing slide. A slide may contain various textual or graphical elements that may be introduced or animated in incremental or step-wise builds. For example, a slide may list a number of textual elements provided as bullet points, but each bullet point may be introduced as a different build of the slide, so that a time interval or user input causes an animation which results in the next build of the slide being displayed. In this way, the slide may be constructed so that it initially appears with a title but no bullet points, then a series of builds each result in the introduction and display of another bullet point on the slide until the steps are complete and the next slide is displayed. Similarly, a slide may include discrete builds in which one or more graphical or textual elements are animated (moved, rotated, scaled, faded in, faded out, and so forth) at each build. Thus, as used herein, it should be understood that the term slide should be understood as encompassing a slide and any or all of the build permutations of that slide, i.e., the slide after animation build 1, animation build 2, and so forth.

With this in mind and returning to the discussion of the edit mode of the presentation application, a user may invoke an action build mode via a respective icon on the toolbar 220. Such an action build mode may allow the user to assign one or more effects to an object or objects 214 displayed on the slide 212 when the slide 212 is displayed during a presentation. For example, the user may assign a sequence of actions, i.e., an action build, to the objects 214 on the slide 212 such that the actions are sequentially implemented to the object 214 via different steps or builds of the slide 212 when the slide 212 is displayed in a presentation. In this way a sequence of actions, such as motion, rotation, as well as changes to color opacity, size and so forth, may be applied to objects 214 on the slide 212 when the slide 212 is displayed in a presentation. For example, such a sequence of actions may be used to animate an object 214 on the slide 212.

Figure 4:
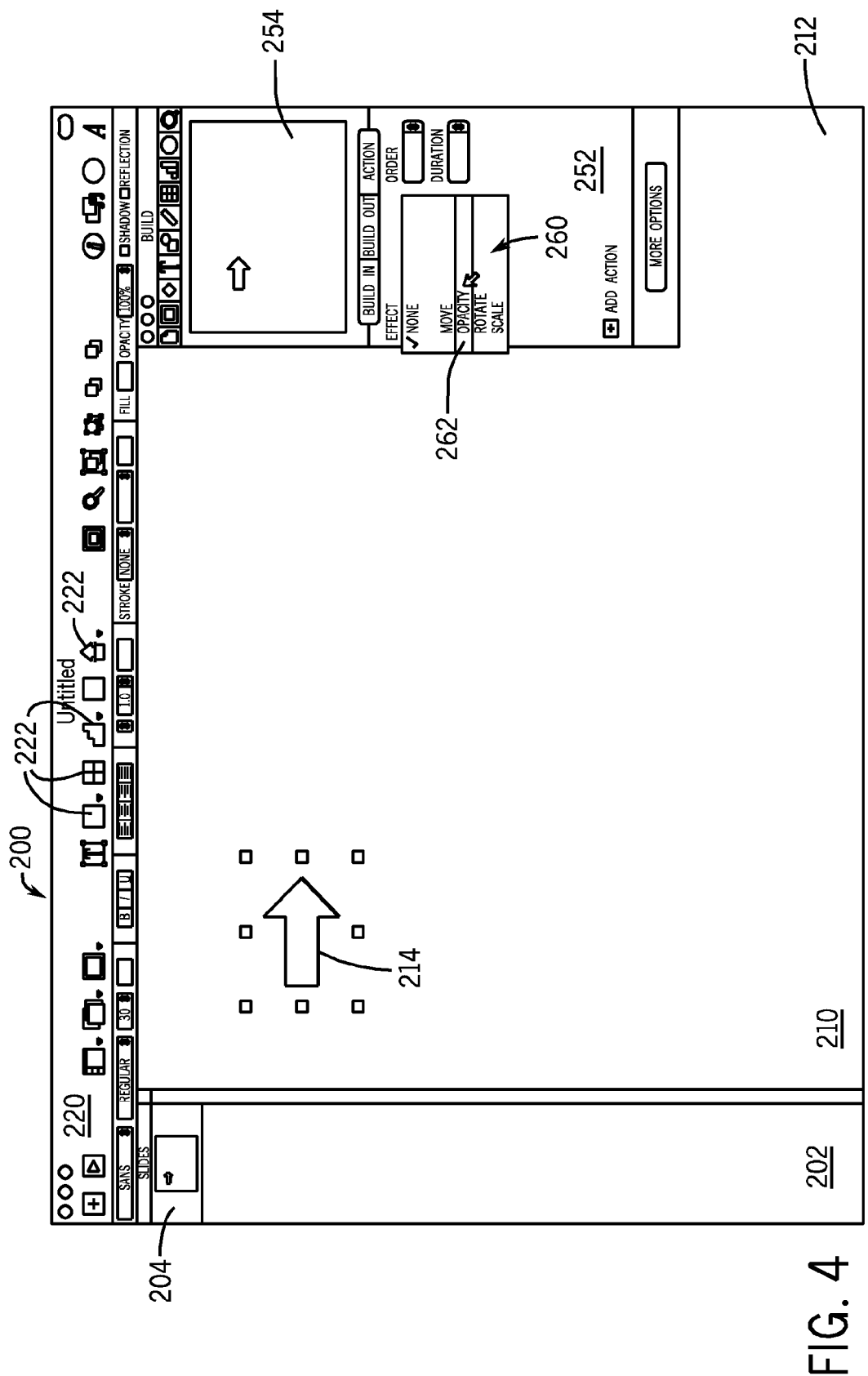
FIG. 4 depicts a screen of a presentation application in which an action may be assigned to an object on a slide, in accordance with one embodiment of the present invention.

FIG. 4 depicts a presentation application screen after activation of an action build mode, in accordance with one implementation. In the depicted embodiment, a build inspector window 252 is provided when in the action build mode. In such an embodiment, a user may interact with the build inspector window 252 to select an action or sequence of actions to be applied to one or more of the objects 214 of the slide 212. For example, the user might generate a sequence of actions to be applied to one or more objects 214 (i.e., an action build) by selecting and/or configuring actions from the build inspector window 252 while the object(s) 214 are selected.

In the depicted embodiment, the build inspector window 252 includes a preview window 254, which may depict the slide 212 as it would appear when displayed as part of a presentation. For example, the preview window 254 may provide an unobstructed view of the slide 212, i.e., without displaying any overlying windows which may be present when constructing or editing the slide 212. Similarly, to the extent that objects 214 are to be animated on the slide 212, the preview window 254 may depict the slide 212 with the object or objects 214 undergoing the specified animation, i.e., as the slide 212 would appear during a presentation.

In one embodiment, the build inspector window 252 may provide one or more selectable or preset action options 260. For example, the build inspector window 252 may include a drop down menu with one or more selectable actions 260 that may be applied to the selected object(s) 214 of the slide 212. In such an embodiment, the user may select a particular action by placing a highlight region 262 over the desired action, for example using a pointer controlled by an input device (e.g., input structure 106, FIG. 1). In the example of FIG. 4, the available actions may include Move, Opacity, Rotate and Scale, though other actions may also be available. In some embodiments, the action options may include computational heavy processes that utilize graphics circuitry 110, if available.

Figure 5:
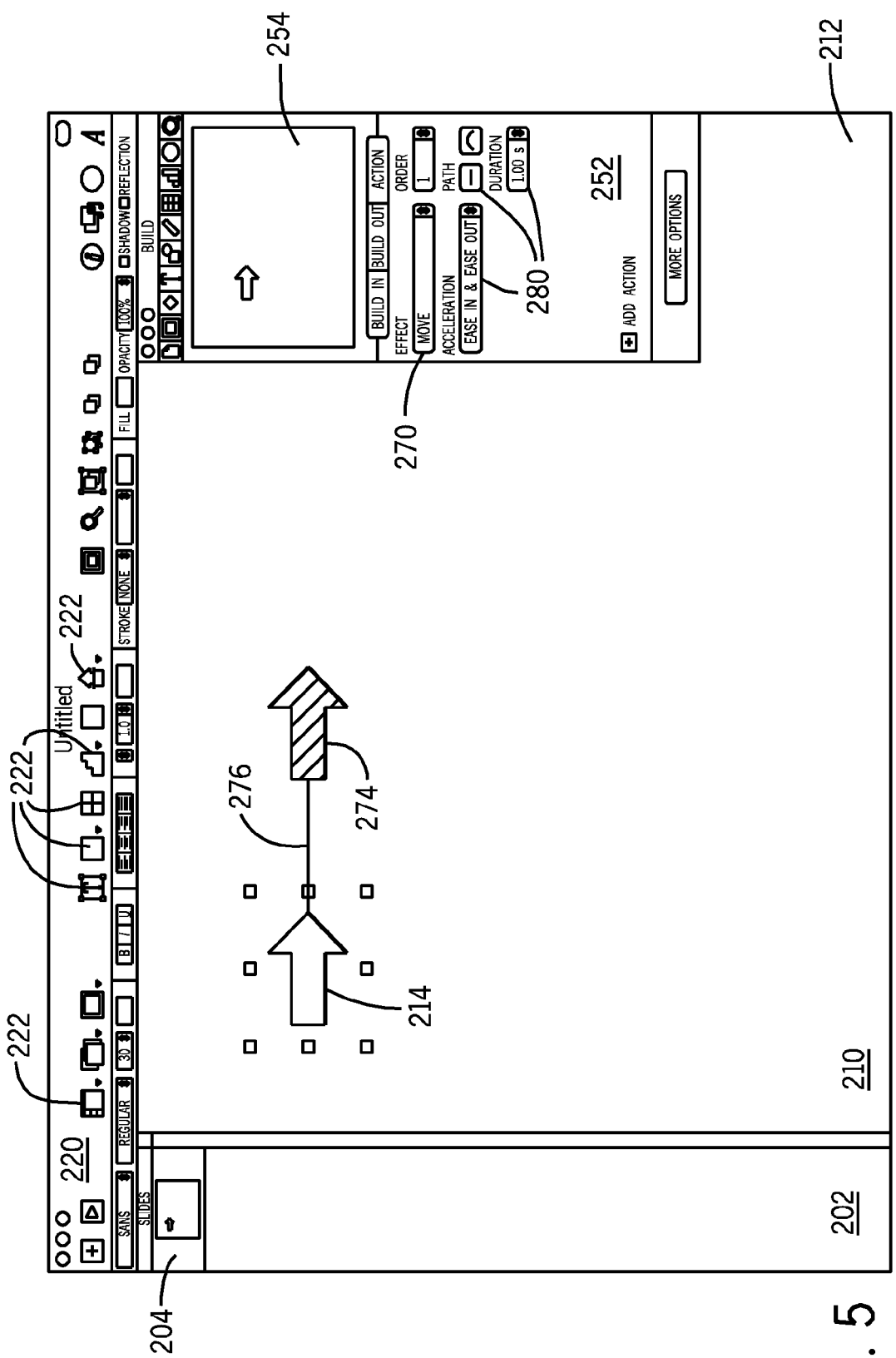
FIG. 5 depicts a screen of a presentation application in which a movement action is assigned to an object on a slide, in accordance with one embodiment of the present invention.

FIG. 5 is an illustrative display of a presentation application screen displayed in response to a user selecting the "move" option 270 from the selectable actions 260 (FIG. 4) displayed on the build inspector window 252. In response to the selection of the "move" action the presentation application may display an "after-action" representation 274 of the object 214 that depicts the object 214 as it will appear after execution of the specified action, such as after being moved in the depicted example. In certain embodiments, the representation 274 may be transparent or semi-transparent (i.e., may have a reduced opacity relative to the object 214) or may otherwise visually indicated (by opacity, color, brightness, shading, borders, or so forth) as representing the object 214 after execution of a specified action or effect.

In addition, in embodiments where the object 214 is moved or rotated, a line 276 may be displayed indicating the path along which the object 214 moves from the starting point of the "move" action to the destination point, i.e., the waypoint or endpoint. The path line 276 may also visually indicate characteristics of the movement, such as whether the motion is at a constant velocity or, if not, where acceleration and deceleration occur. Such visual indication may be provided by use of color or of dotted and/or dashed lines to indicate different types of motion.

In one such embodiment, the user may select and move the representation 274 to set or change the location of the waypoint to which the object 214 is moved. Similarly, in some embodiments, the user may select and change the shape of the path line 276, for example by selecting and dragging one or more points of line 276. Thus the path line 276 need not be linear, but may undergo curved or angular changes in direction, as specified by the user.

In one implementation, a user may define settings controlling the action specified using the build inspector window 252. For example, in the depicted implementation, selection of the "move" option 270 results in the display of move options 280, such as path type (curved or linear), duration of the move, and acceleration characteristics. As will be appreciated, the presentation application may include these and/or other suitable options or settings for such a "move" action. Likewise, for other selectable actions 260, these or other appropriate options may be displayed upon selection of the desired action.

As discussed above, in some embodiments, the presentation application may preview the selected action applied to object 412 on preview window 254. For example, after the user configures a "move" action, changes a setting of a selected "move" action, changes the path of the object 214, and/or changes the waypoint destination of the object 214, the presentation application may animate object 214 in preview window 254 to show the animation as it will appear during presentation of the slide 212. Likewise, animations incorporating rotations, changes in scale, changes in opacity, and so forth, may also be displayed in the preview window 254, as discussed below.

While movement represents one type of action that may be applied to the object(s) 214, other types of actions may also be possible. As discussed above, actions related to opacity, rotation, and scaling, as well as others, may also be provided by the presentation application. For example, referring to FIG. 6, a user may select an "opacity" option 290 from a drop-down list of selectable actions 260 (FIG. 4) displayed on the build inspector window 252. In response to the selection of the "opacity" action the presentation application may display an "after-action" representation 274 that depicts the object or objects 214 as they will appear after the action is applied or otherwise visually indicates that the action is performed to the object(s) 214.

Figure 6:
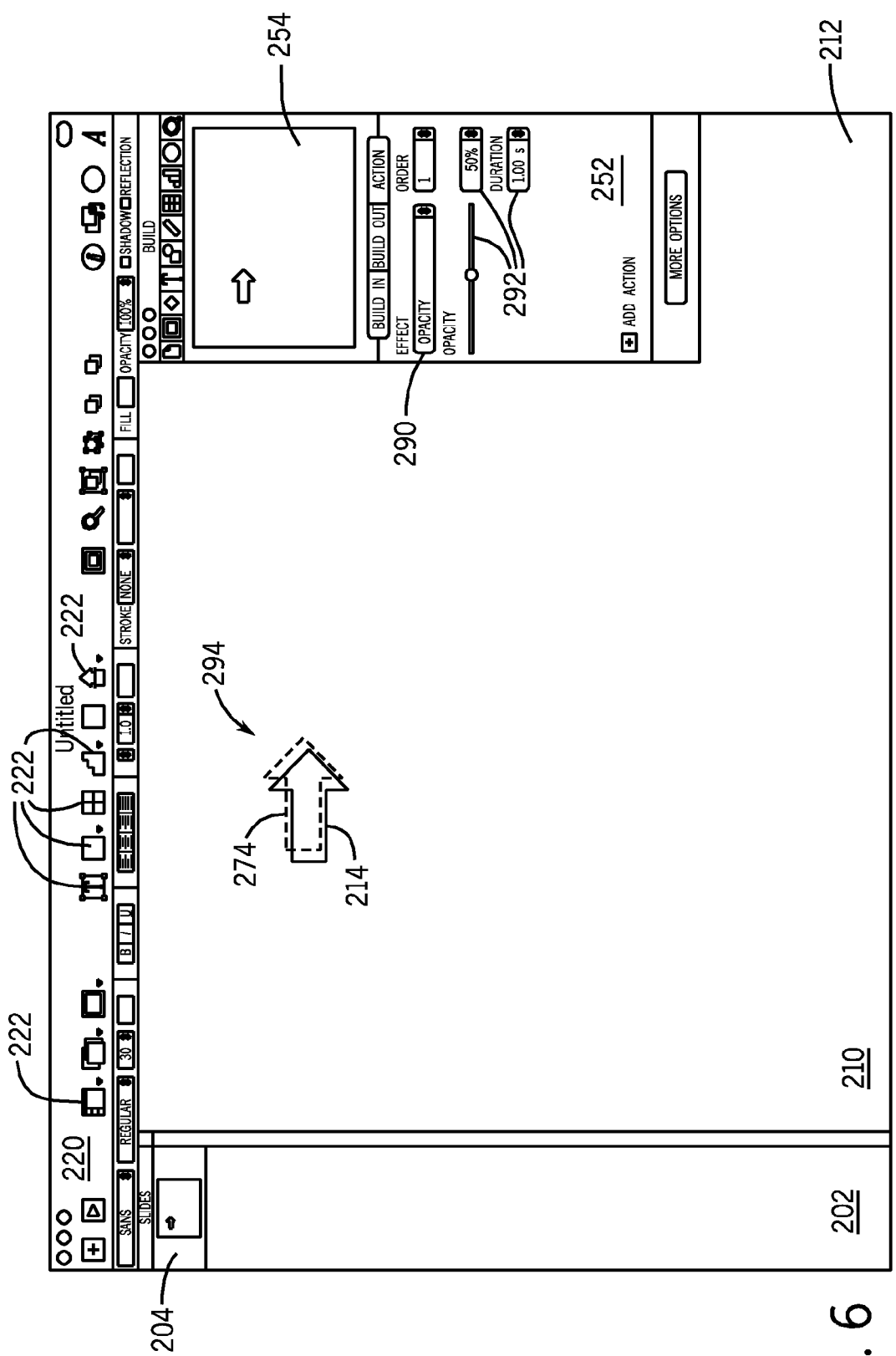
FIG. 6 depicts a screen of a presentation application in which an opacity action is assigned to an object on a slide, in accordance with one embodiment of the present invention.

For example, in the context of the present "opacity" action, the opacity and/or the outline of the representation 274 may be visually altered to indicate the change in opacity. In instances where the object(s) 214 does not move while the opacity is changed, i.e., where the object(s) 214 is stationary when changing opacity, the presentation application may depict the object(s) 214 and the "after-action" representation 274 as a stack 294 or layer of images to indicate that the object is being changed, as depicted in FIG. 6. Such an implementation may be useful in instances where it would otherwise be difficult to distinguish a depicted object 214 and a corresponding overlying or underlying representation having a different opacity. Likewise, in instances where the opacity of the object 214 and/or the "after-action" representation 274 is transparent or nearly transparent (i.e., where the opacity is at or near zero), the presentation application may display the transparent or nearly transparent image using an outline or other visual indication that an object or representation is present, even though it is essentially transparent.

In certain implementations a user may define settings controlling an opacity effect using the build inspector window 252. For example, in the depicted implementation, selection of the "opacity" option 290 results in the display of opacity options 292, such as a slider or numeric field for setting the degree of opacity of the object (s) 214 and/or a duration over which the change in opacity occurs. As will be appreciated, the presentation application may include these and/or other suitable options or settings for such an "opacity" action.

After the user configures an "opacity" action and/or changes a setting of a selected "opacity" action, the presentation application may animate an object 214 in preview window 254 to show the animation, in this example, a change in opacity, as it will appear during presentation of the slide 212. Thus, in certain embodiments, the user may preview how the slide 212 will appear during a presentation, including a change in opacity effect applied to an object 214.

Figure 7:
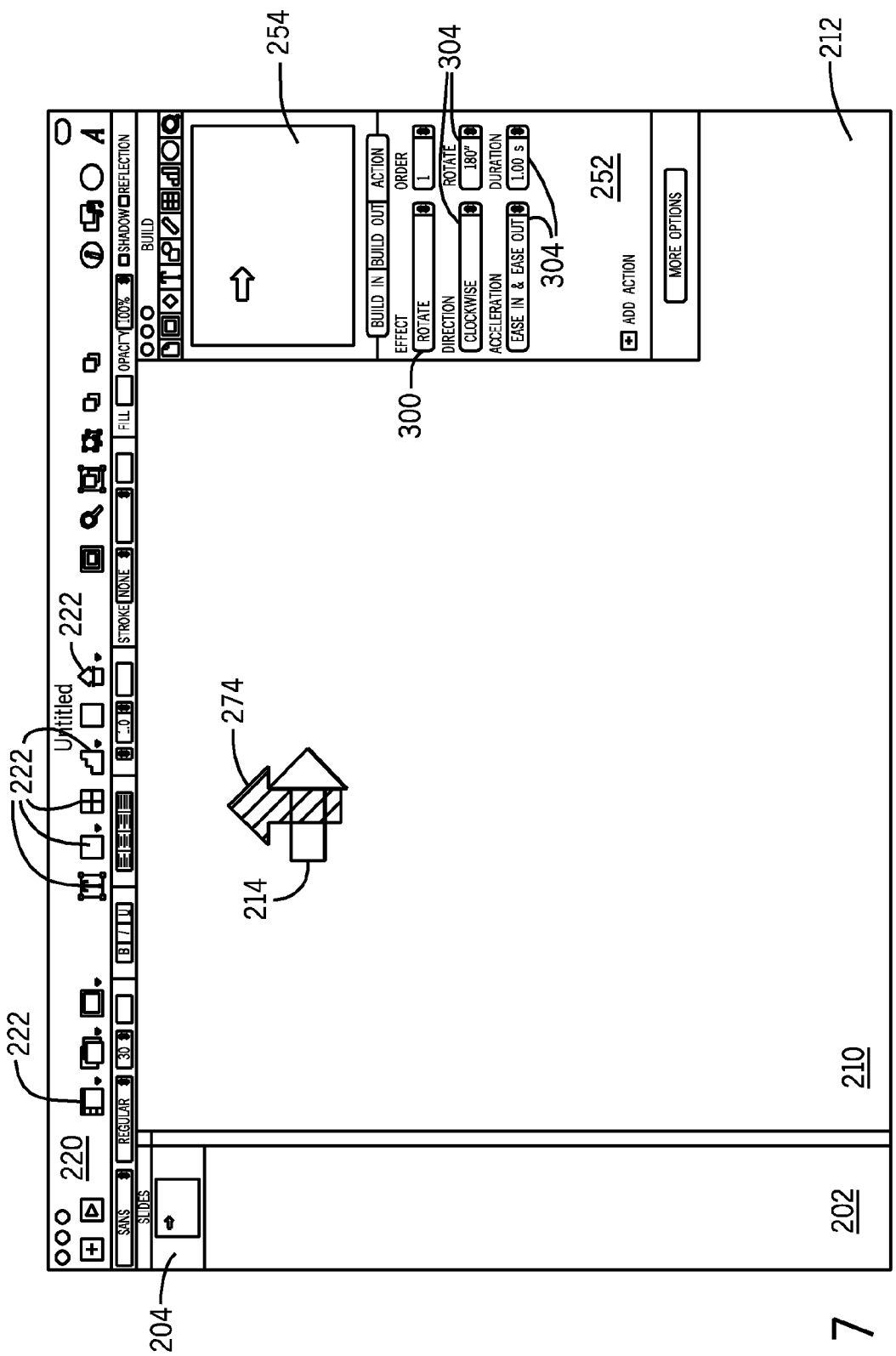
FIG. 7 depicts a screen of a presentation application in which a rotation action is assigned to an object on a slide, in accordance with one embodiment of the present invention.

Referring to FIG. 7, in certain implementations a user may select a "rotate" option 300 from a drop-down list of selectable actions 260 (FIG. 4) displayed on the build inspector window 252. In response to the selection of the "rotate" action the presentation application may display an "after-action" representation 274 of an object or objects 214 that depicts the object of objects 214 after rotation. In certain embodiments, the user may select the representation 274 and alter the degree of rotation of the representation 274, thereby changing the degree of rotation applied to the object 214 by the corresponding action.

As described with the preceding types of actions, in certain implementations a user may define settings controlling a rotation effect using the build inspector window 252. For example, in the depicted implementation, selection of the "rotate" option 300 results in the display of rotation options 304, such as for entry of the rotation orientation, the rotation amount (e.g., in degrees), the direction of rotation, the duration over which the rotation takes place, the speed and/or acceleration of the rotation, the characteristics, if any, of the acceleration of the rotation, and so forth. As will be appreciated, the presentation application may include these and/or other suitable options or settings for such a "rotation" action.

After the user configures a "rotation" action and/or changes a setting of a selected "rotation" action, the presentation application may animate object 214 in preview window 254 to show the rotation of the object or objects 214 as it will appear during presentation of the slide 212. Thus, in certain embodiments, the user may preview how the slide 212 will appear during a presentation, including a rotation effect applied to an object 214.

Figure 8:
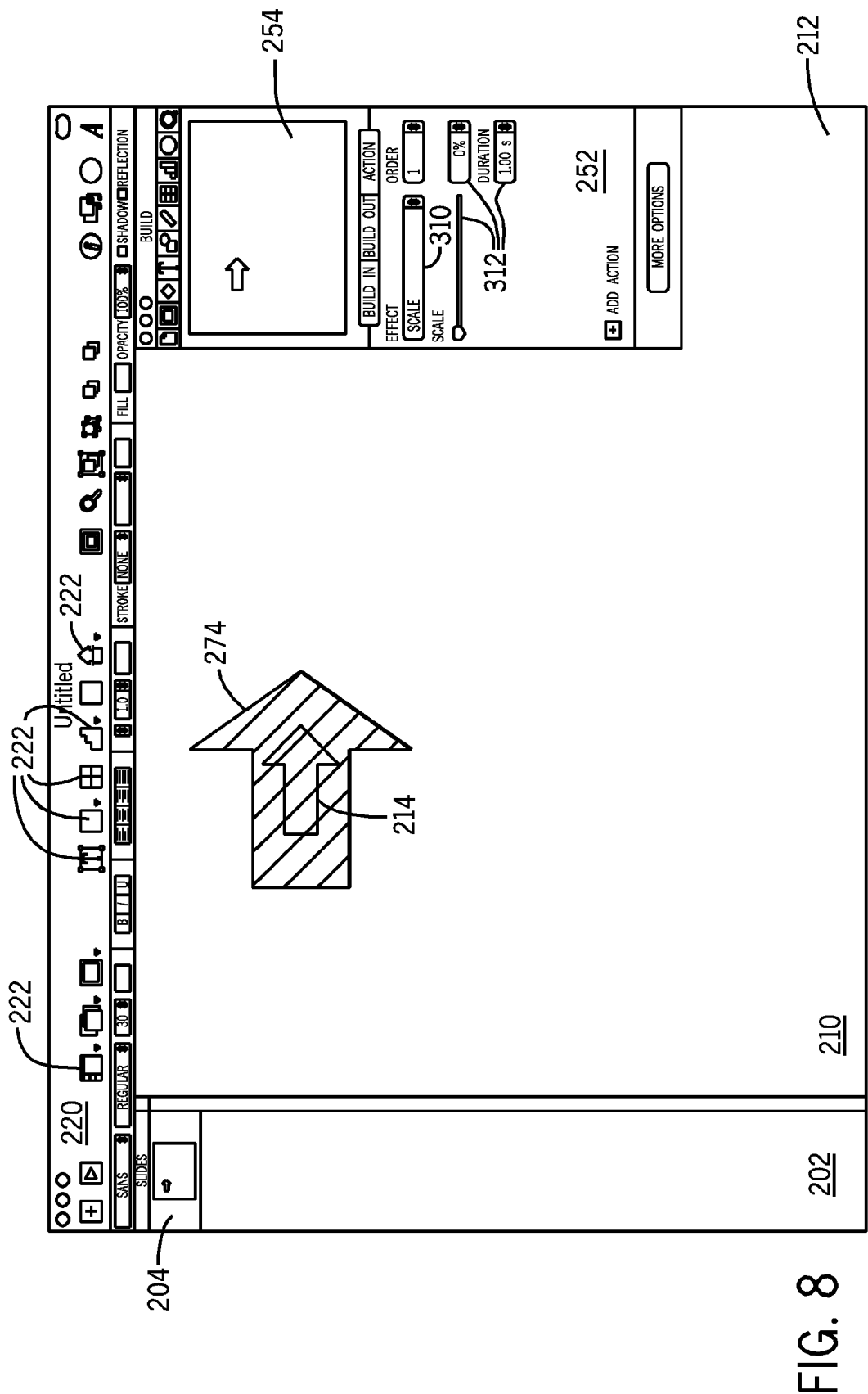
FIG. 8 depicts a screen of a presentation application in which a scaling action is assigned to an object on a slide, in accordance with one embodiment of the present invention.

Turning to FIG. 8, in certain implementations a user may select a "scale" option 310 from a drop-down list of selectable actions 260 (FIG. 4) displayed on the build inspector window 252. In response to the selection of the "scale" action the presentation application may display an "after-action" representation 274 of an object or objects 214 that depicts the object or objects 214 after an increase (depicted in FIG. 8) or reduction in size. In certain embodiments, the user may select the representation 274 and alter the degree to enlarge or reduce the size of the representation 274, thereby changing the degree of scaling applied to the object 214 by the corresponding action.

As described with the preceding types of actions, in certain implementations a user may define settings controlling a scaling effect using the build inspector window 252. For example, in the depicted implementation, selection of the "scale" option 310 results in the display of scaling options 312, such as for entry of the amount or degree of scaling (e.g., −100%, −50%, −25%, 25%, 50%, 100%, 200%, and so forth) relative to the initial size of the object or objects 214, the duration over which the scaling effect is applied, rate or change in rate of the scaling effect and so forth. As will be appreciated, the presentation application may include these and/or other suitable options or settings for such a "scale" action.

After the user configures a "scale" action and/or changes a setting of a selected "scale" action, the presentation application may animate object 214 in preview window 254 to show the object or objects 214 being changed in scale as will occur during presentation of the slide 212. Thus, in certain embodiments, the user may preview how the slide 212 will appear during a presentation, including a scaling effect applied to an object 214.

The preceding describes different individual actions that may be applied to an object or objects 214 selected on a slide 212. As described, in conjunction with each action, an after-action representation 274 of the object 214 is displayed on the slide canvas 210 so that a user can see the placement and/or appearance of the object 214 at each stage of the animation of the slide 212.

However, it should also be appreciated that, in certain implementations, an object or objects 214 may have more than one action assigned. For example, the user may define several successive actions to be applied to an object 214. In one embodiment, for objects 214 on which multiple actions are applied, each action applied to the object 214 is listed in a build order window 310. For example, in the depicted embodiment the build order window 310 sequentially lists the actions 312 (such as "move", "rotate", "scale" and/or "opacity" actions) applied to the object 214. A user may cause the build order window 310 to be displayed using any suitable approach. For example, in one implementation the build order window 310 may be displayed when an additional action (i.e., a second, third, fourth, and so forth action) is added to an object 214 on the slide 212 (such as by using an "add action" option 308). Likewise, the build order window 310 may be displayed when an object 214 which has at least two actions already assigned is selected on the canvas 210.

The listing 312 of actions provided in the build order window 310 may include any suitable information, such as an indication of the object 214 to which the actions apply, the type of actions specified, the order in which the actions are to be applied to the object 214, and so forth. A user may select a listed action for review or modification using any suitable approach, such as by placing highlight region over an action of interest to select the action.

For example, in one embodiment, a user may select a listed action 314 from the build order window 310 to display settings and/or options associated with that particular action (displayed in the build inspector window 252 in the present example) and may review and/or modify such settings and options. In one embodiment, selection of an action 314 in the list 312 of actions may cause the corresponding "after-action" representation and/or path to be visually indicated, such as by use of color, brightness, shading, and/or line- or border-type. Conversely, selecting an "after-action" representation or path on the canvas 210 may cause selection of the corresponding action or actions 312 in the build order window 310.

The presentation application may initiate respective listed actions 312 using any suitable approach. In some embodiments, the user may define the manner in which the presentation application initiates one or more of the listed actions 312. In the depicted embodiment a dropdown menu 316 is provided listing different initiation options. For example, the user may select an option that causes the selected action 314 to be performed on the object(s) 214 in the event of a mouse click or similar input from an input structure 106 (FIG. 1). In such an example, a user giving a presentation that includes the slide 212 may click a mouse button to initiate the next specified action in the list 312, such as to initiate a selected "move" or "rotate" action on the object 214. Thus, a user input may serve as the trigger that causes a specified action to be performed on the object(s) 214.

However, other conditions may also act to initiate a listed action to be performed on the object 214. For example, the dropdown menu 316 (or other selection mechanism) may provide other options for initiating some or all of the listed actions associated with object 214. For example, in addition to a mouse click or other user input, the dropdown menu 316 may allow the user to specify a time delay (e.g., 1 second), such as in field 318, after which an action in the list 312 is initiated after completion of the preceding action in the list 312. Alternatively, an action in the list 312 may be designated to begin as soon as the preceding action completes, simultaneously or in conjunction with the start of the preceding action in the list 312 (for example, an object 214 may begin a "rotate" and/or "fade" action at the same time a "move" action begins), or in a staggered manner, such as after the preceding action begins but before the preceding action completes (for example, an object 214 may begin a "rotate" and/or "fade" after a "move" action begins but before the "move" action ends). Similarly, multiple actions may be assigned to an object 214 such that the actions end at the same time, such as at the completion of a move, regardless of whether the actions began at the same time or not. Likewise, other suitable initiation conditions may also be configurable for each listed action 312, such as via the dropdown menu 316.

In some embodiments, the presentation application may preview the successive actions applied to the object(s) 214 in the preview window 254. The preview of the slide 212 displayed in the preview window 254 may be configured to act in accordance with the designated initiation conditions for each action (such as to wait for a mouse click to advance or to implement a specified time delay) or may show the complete build or animation sequence without waiting for such cues. In some embodiments, the preview may be performed based on some but not all action initiation conditions. For example, the preview may not wait for user inputs when these are specified to begin an action (i.e., the preview may simply assume the presence of such a user input), but may wait for specified time delays and so forth.

Thus, in accordance with these embodiments, multiple actions can be assigned to an object 214 of a slide 212. The assigned actions can be configured to begin and/or end at the same times (or in response to the same inputs), to begin in sequence (i.e., one beginning after the completion of the previous), and/or to begin in an overlapping manner (i.e., one beginning after the previous action has begun but before the previous action has ended). Further, as described herein, in one embodiment the presentation application may display representations of the object 214 on slide canvas 210 which depict the object 214 after the completion of one or more actions so that a user can see the placement and/or appearance of the object 214 at each stage of the animation of the slide 212. Such "after-action" representations may be displayed for all objects 214 on the slide 212 or only for a selected object or objects 214. Likewise, the "after-action" representations may be displayed for only certain actions, such as "move" or "rotate" actions, applied to an object 214 or may be otherwise limited, such as based on number or space constraints, to avoid unduly cluttering the canvas 210

Figure 9:
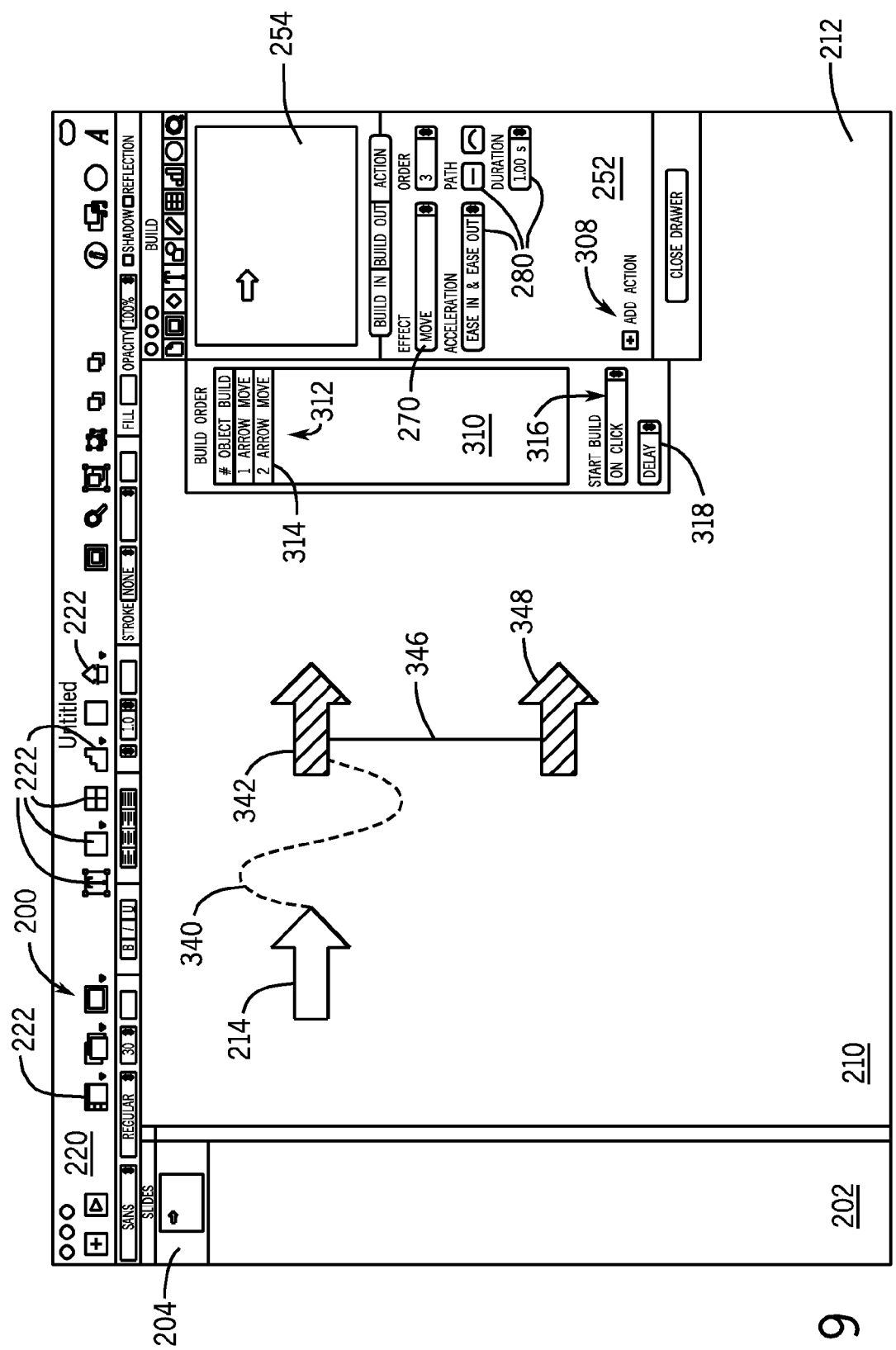
FIG. 9 depicts a screen of a presentation application in which a series of actions is assigned to an object on a slide, in accordance with one embodiment of the present invention.

With the foregoing in mind and by way of example, FIG. 9 depicts an object 214 undergoing two successive movements. In the depicted screen, the user has generated a curved first path line 340 between object 214 and a first representation 342 depicting the object 214 at a first waypoint after completion of the first action, i.e., after the first move. A second action is then configured to move the object 214 along a straight second path line 346 to a second waypoint, where the object 214 is depicted by a second representation 348 as it would appear after completion of the second action. As discussed above, the successive actions may each be configured (such as at drop down menu 316 and field 318) to begin in response to a user input (i.e., a mouse click) or automatically (such as based on the completion of a previous action, with or without a time delay).

Figure 10:
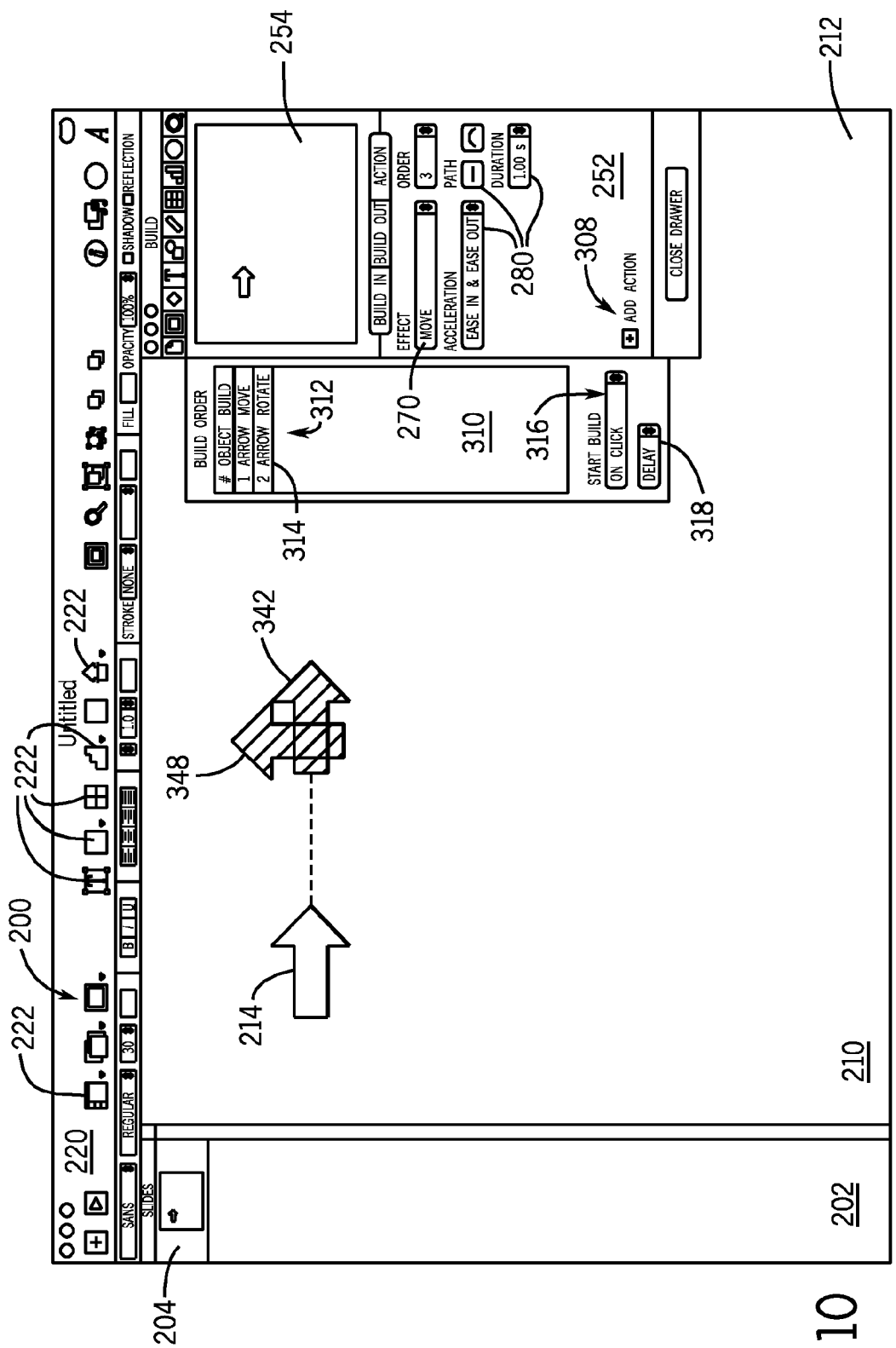
FIG. 10 depicts a screen of a presentation application in which another series of actions is assigned to an object on a slide, in accordance with one embodiment of the present invention.

Similarly, FIG. 10 depicts a series of successive actions applied to an object 214. In the depicted screen, the object 214 is moved to a first waypoint where its position after completion of the action, i.e., the movement, is shown by a first representation 342. A second action is then configured to rotate the object 214 ninety-degrees. The result of this action applied to the object 214 is depicted by a second representation 348 as it would appear after completion of the second action, i.e., the rotation. Thus, in this example, the object 214 is moved and then separately rotated, with a distinct "after-action" representation provided for the completion of each successive action. The successive actions may each be configured (such as at drop down menu 316 and field 318) to begin in response to a user input (i.e., a mouse click) or automatically (such as based on the completion of a previous action, with or without a time delay).

Figure 11:
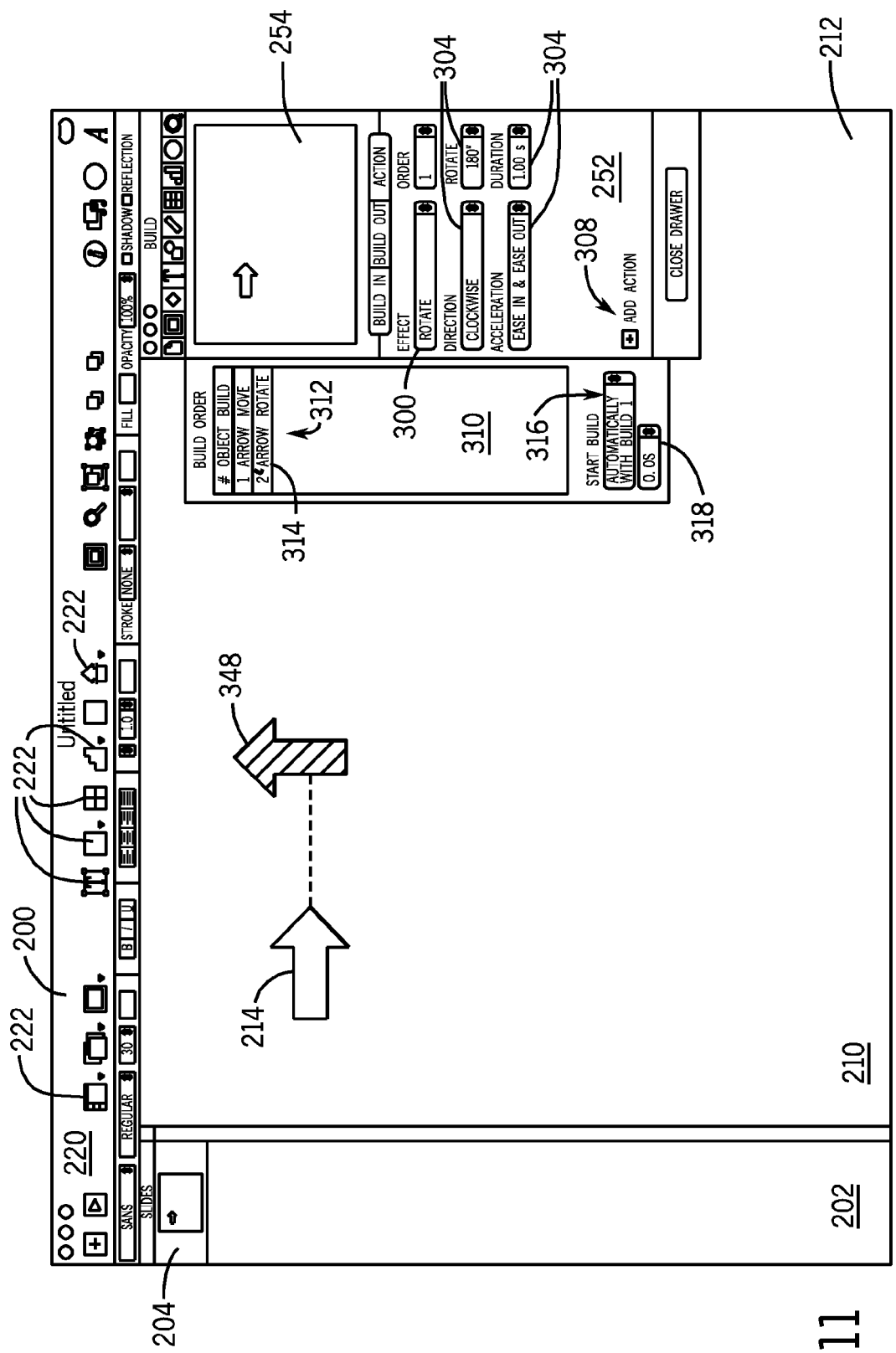
FIG. 11 depicts a screen of a presentation application in which a further series of actions is assigned to an object on a slide, in accordance with one embodiment of the present invention.

Turning to FIG. 11, a corresponding example is provided where the movement and rotation of the object 214 occurs simultaneously. In this example, the object 214 is concurrently rotated and moved to a waypoint where the object 214 as it would appear after the concurrent movement and rotation is depicted by the representation 348. Thus, in this example, the object 214 is moved and concurrently rotated, with a single "after-action" representation 348 provided depicting the outcome of the combined actions. In one implementation, one of the actions may be configured (such as at drop down menu 316 and field 318) to begin in response to a user input (i.e., a mouse click) or automatically (such as based on the completion of a previous action, with or without a time delay). The second, concurrently implemented action, may be configured to begin automatically with the other action, such as via an option in the drop-down menu 316. To indicate in the listing 312 of build order window 310 that the actions will be performed simultaneously, the presentation application may display a visual indicator 352 linking concurrently implemented actions.

Figure 12:
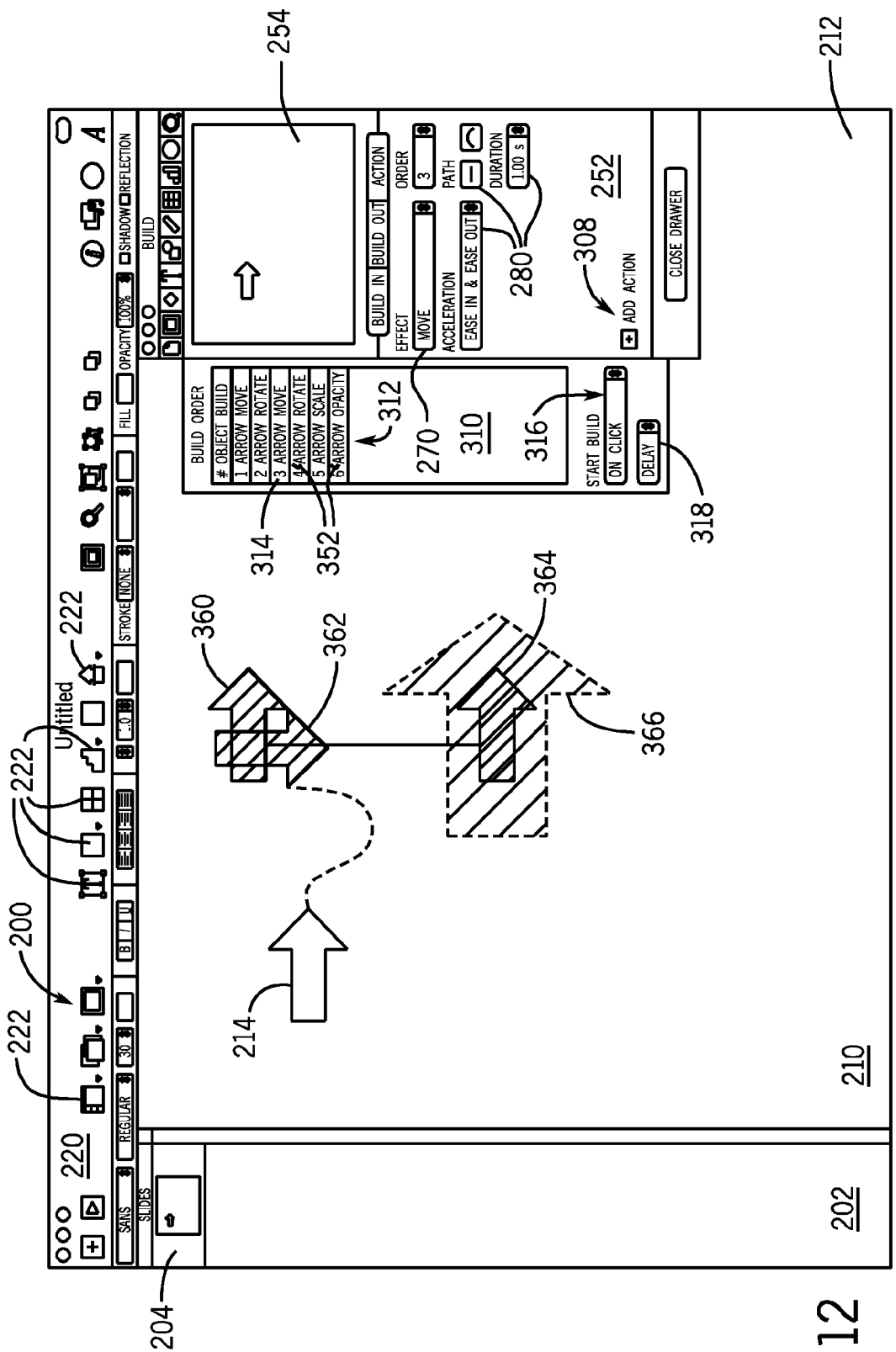
FIG. 12 depicts a screen of a presentation application in which another series of actions is assigned to an object on a slide, in accordance with one embodiment of the present invention.

By way of further example, an object 214 subjected to a series of actions is depicted in FIG. 12. In this example, the object 214 is successively moved and rotated to point in the direction of the next move, with the representations 360 and 362 representing the position and orientation of the object 214 after the move and rotation respectively. Next, the object 214 is configured to concurrently move and rotate, with the representation 364 representing the position and orientation of the object 214 after the concurrent move and rotate actions. Next, the object 214 is concurrently enlarged and faded into transparency (using respective scale and opacity actions), such as to simulate rising off the slide 212 and disappearing. In this example, the representation 366 relates the size and change in opacity of the object 214 after the concurrent scaling and opacity actions. As noted previously, in this implementation the presentation application may preview the actions applied to the objects 214 in the preview window 254 such that a user can review how the slide 212 will appear in a presentation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for generating or editing a slide, comprising:
    interacting with one or more input structures of a computer to select an object displayed on a slide editing pane of a presentation application executing on the computer; and
    assigning at least one action to be performed on the object when the slide is displayed in a presentation, wherein one or more representations are displayed concurrently with the object on the slide editing pane and wherein each representation depicts the object as it will appear after a respective action or actions are performed.

2. The method of claim 1, comprising interacting with one or more input structures to manipulate at least one representation such that a corresponding action to be performed on the object is modified.

3. The method of claim 1, wherein assigning at least one action to be performed on the object comprises assigning at least one of a movement action, a rotation action, an opacity action, or a scaling action to the object.

4. The method of claim 1, wherein assigning at least one action to be performed on the object comprises selecting an action from a list displayed by the presentation application.

5. The method of claim 1, comprising reviewing the slide as it will appear in a presentation using a preview window that is distinct from the slide editing pane of the presentation application.

6. A method for depicting effects of actions performed to objects on a slide, comprising:
    receiving a first input from one or more input structures of a computer executing a presentation application, wherein the first input selects an object displayed on a slide editing pane of the presentation application;
    receiving a second input indicative of one or more actions to be performed on the object; and
    concurrently displaying one or more representations with the object on the slide editing pane, wherein each representation depicts the object as it will appear after a respective action or actions are performed on the object.

7. The method of claim 6, comprising displaying a list of actions from which the one or more actions are selected to generate the second input.

8. The method of claim 6, comprising displaying a list indicating the one or more actions to be performed on the object.

9. The method of claim 6, comprising:
    receiving a third input manipulating a representation; and
    modifying the respective action or actions based on the third input.

10. The method of claim 6, wherein displaying the one or more representations comprises displaying one or more transparent or semi-transparent representations of the object.

11. The method of claim 6, comprising displaying one or more options used to configure the one or more actions to be performed on the object.

12. The method of claim 6, wherein the one or more actions include one or more of a movement, a rotation, a change in opacity, or a change in scale.

13. The method of claim 6, comprising displaying, in a preview window distinct from the slide editing pane, a preview of the slide in which the one or more actions are performed on the object.

14. A method for reviewing effects applied to objects on a slide, comprising:

assigning one or more effects to be applied to an object displayed on a slide editing pane of a presentation application running on a computer; and reviewing one or more representations displayed concurrently with the object on the slide editing pane, wherein each representation depicts the object after application of one or more respective effects.

15. The method of claim 14, comprising modifying an effect applied to the object by manipulating a corresponding concurrently displayed representation.

16. The method of claim 14, wherein the one or more effects include one or more of a movement, a change in opacity, a change in scale, or a rotation.

17. The method of claim 14, comprising assigning one or more initiation conditions for each effect to specify when the effect will begin during a presentation of the slide.

18. A computer-readable media, the computer-readable media encoding routines which, when executed by a processor, cause acts to be performed comprising:

receiving one or more user selections indicative of actions to be applied to an object displayed on a slide editing pane of a presentation application; and concurrently displaying one or more manipulatable representations of the object on the slide editing pane with the object, wherein each representation depicts the object as it would appear after application of one or more respective actions.

19. The computer-readable media of claim 18, wherein the computer-readable media further encodes routines which, when executed by a processor, cause acts to be performed comprising:

a routine capable of receiving a user input manipulating a representation; and a routine capable of modifying the one or more actions corresponding to the representation based upon the user input.

20. The computer readable media of claim 18, comprising a routine capable of displaying, in a preview window that is distinct from the slide editing pane, a preview of the slide in which the object is animated in accordance with the user selected actions.

* * * * *